April 10, 1951  J. MIHALYI  2,548,549
ROLL HOLDING CAMERA WITH MOVEABLE SPOOL SECTION
Filed Feb. 8, 1947  3 Sheets-Sheet 1

Joseph Mihalyi
INVENTOR
BY
ATTY. & AG'T.

April 10, 1951 J. MIHALYI 2,548,549
ROLL HOLDING CAMERA WITH MOVEABLE SPOOL SECTION
Filed Feb. 8, 1947 3 Sheets-Sheet 2
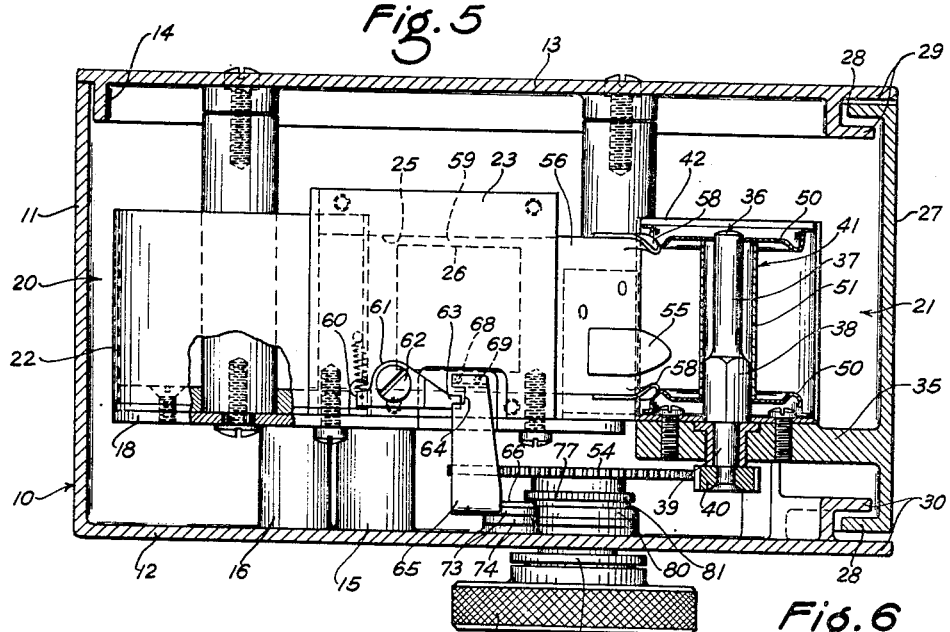
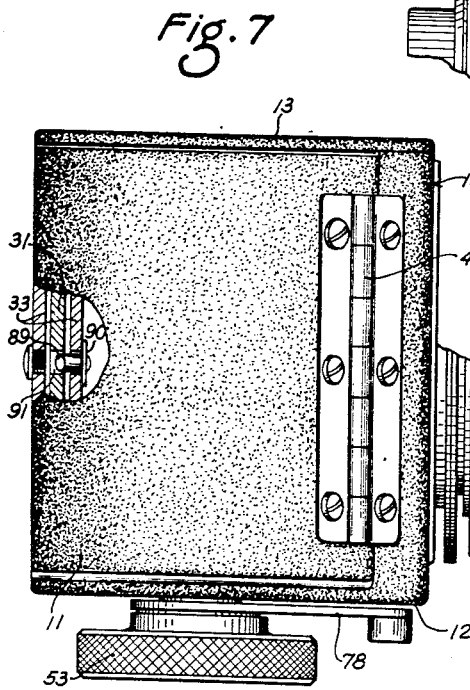
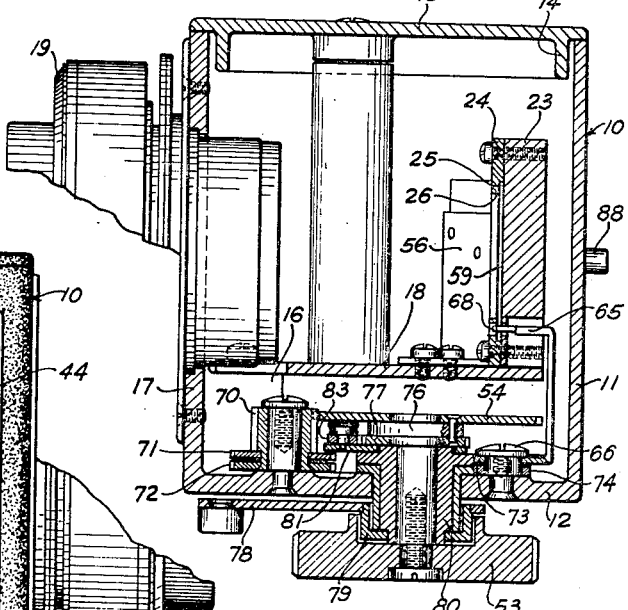
Joseph Mihalyi
INVENTOR Joseph Mihalyi
INVENTOR Patented Apr. 10, 1951

2,548,549

UNITED STATES PATENT OFFICE 2,548,549

ROLL HOLDING CAMERA WITH MOVABLE SPOOL SECTION

Joseph Mihalyi, Rochester, N. Y., assignor to Eastman Kodak Company, Rochester, N. Y., a corporation of New Jersey Application February 8, 1947, Serial No. 727,391

13 Claims. (Cl. 95—31)

This invention relates to photography and more particularly to roll holding cameras.

The primary object of the present invention is to provide an arrangement whereby a camera of the roll holding type can be easily and quickly loaded with a spool of film.

A further object of the invention is to utilize a section forming a portion of the camera body as a support for the film spool.

A still further object of the invention is to provide a spool chamber which has a section of its wall moved or rotated away from the camera body for loading with a roll of film.

Another object of the invention is to provide an arrangement in which the film advancing mechanism is disconnected from the film spool when the spool chamber is moved to a loading position.

And yet another object of the invention is to provide a loading arrangement for a roll holding camera in which the film can be advanced only when the section of the casing supporting the film spool and forming a portion of the spool chamber is in its chamber enclosing position.

These and other objects of the invention will be apparent from the description which follows.

Cameras of the roll holding type usually require that the entire back of the camera be removed in order to load the camera with film. This procedure requires a leader strip on the film, particularly if it is of the daylight loading type, and also the handling of two spools and proper placing of the film over the exposure aperture. In many cases the back of the camera is detachable which requires additional handling together with the spools. Other roll holding cameras which utilize a single spool are usually loaded by dropping the spool into a cavity in the camera body. While this arrangement does facilitate loading, the unloading or retrieving of the spool then presents a problem. In the present invention, all of the above shortcomings of roll holding cameras are overcome. A simple, efficient means for both loading and unloading the film spool from the camera is accomplished by providing a movable section of the casing which supports the single spool. Since no leader strip is required, the camera may be loaded or unloaded in daylight without any fear of fogging the film. And since the film spool is disconnected from the film advancing mechanism during loading and unloading, there is no waste of film.

The objects of the invention are embodied in a camera comprising a casing which has a film take-up chamber into which a loose coil of film may be wound, a spool chamber with means for centering a spool of film thereon, and an exposure aperture between the chambers and in line with the camera objective lens. The spool chamber comprises a section forming a portion of the wall of the casing and has a supporting member for the spool centering means which is operatively connected to the drive means for the film and has a driving connection adapted to be engaged by the film spool. The spool chamber section is connected to the casing to permit it to be moved or rotated away from the casing for the loading or unloading of the film spool, and when the section is in this position, the driving means for advancing the film is disconnected from the spool centering means.

Reference is now made to the accompanying drawings wherein similar reference characters designate similar parts and wherein:

Fig. 5 is a vertical section through the camera taken substantially on the line 5—5 of Fig. 1;

Fig. 6 is a vertical section through the camera taken substantially on the line 6—6 of Fig. 1;

Fig. 7 is a right side elevation of the camera; and

Figure 8:
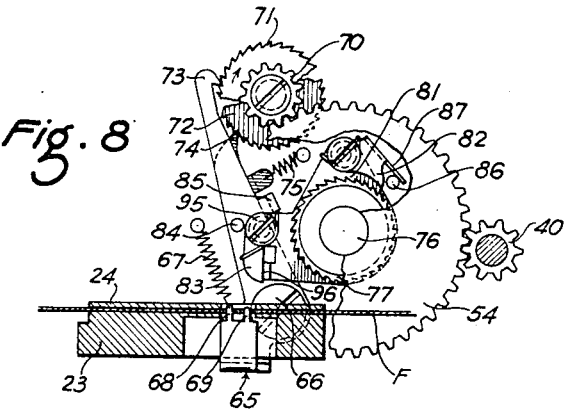
Fig. 8 is a detail view of the drive mechanism with various parts broken away and showing the relative position of the elements when the film strip has been wound into the take-up chamber and the pins on the control lever are in engagement with the spaced perforations near the end of the film strip.
Figure 9:
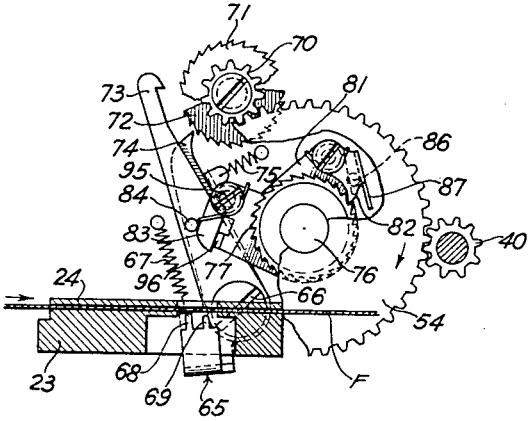
Figure 10:
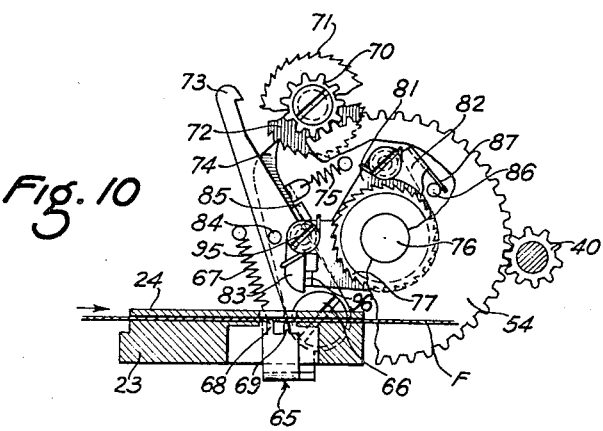

Fig. 9 is a detail view similar to Fig. 8 and showing the control lever rotated into a position in which the pins thereon are removed from the spaced perforations to permit winding of the film strip from the take-up chamber to the supply chamber; and Fig. 10 is also a detail view similar to Fig. 8 and showing the control lever in its drive arresting position when the longer pin thereon is in engagement with a film perforation and the shorter pin is in engagement with the film strip to limit the movement of said lever.

In the illustrated embodiment of the invention, the casing 10 comprises a continuous vertical side wall 11, a bottom wall 12, and a cover plate 13. The cover plate 13 is provided with a downward extending flange 14 which makes a light-lock with the wall 11. The wall 12 is provided with a boss 15 and two bosses 16 adjacent the front wall 17 of the casing 10 for supporting the mechanism plate 18. The objective 19 is mounted on the front wall 17 and is of a standard construction with a between-the-lens shutter. The shape of the casing 10 is best determined by reference to Fig. 1 and it will be noted that the arcuate ends of the casing provide for a take-up chamber 20 and a spool chamber 21. The plate 18 which carries the receptacle 22 for receiving the film in a loose coil also has mounted thereon, in line with the objective lens 19 and between the chambers 20 and 21, a block 23 with a plate 24 secured to the front face thereof. The plate 24 has a recess 25 for the film and an exposure aperture 26 which will be more fully described hereinafter.

Figure 1:
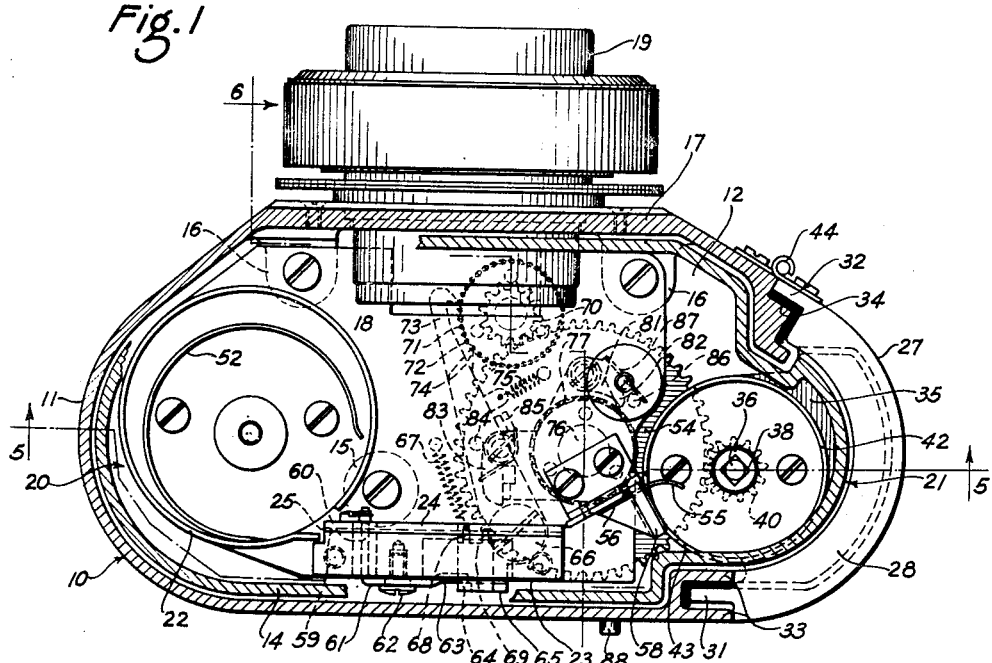
Fig. 1 is a plan view of a camera embodying the invention in which the casing and a portion of the top plate are shown in section.

The spool chamber end of the casing 10 is provided with an arcuate section 27 which conforms to the shape of the cover plate 13 and the bottom wall 12. The section 27 is provided at the ends thereof with horizontally extending flanges 28 which, when the section 27 is in the chamber enclosing position as shown in Fig. 1, cooperates with the double flange 29 on the plate 13 and the double flange 30 on the bottom wall 12 to form a light-lock. The section 27 is also provided with vertically extending flanges 31 and 32 which cooperate with the double flange 33 at the rear of the casing 11 and recess 34 in the front wall, respectively, to completely light-lock the spool chamber 21 when the section 27 is in the chamber enclosing position. The section 27 has formed integral therewith, a support member 35 which, when the section 27 is in the chamber enclosing position, extends into the chamber 21.

The centering means for the film spool is mounted on this member 35 and comprises a spindle 36 having a cylindrical guide portion 37 and square portion 38. The reduced portion 39 provides the bearing for the spindle in the member 35 and has fixed to the end thereof a pinion 40. The square portion 39 provides a driving connection for the film spool 41 which has a corresponding aperture in one flange thereof. A cylindrical member 42 is mounted on the support member 35 and is concentric with respect to the spindle 36 for enclosing the film spool 41 and for guiding the film spool onto the centering means. The member 42 is provided with an aperture 43 for a purpose about to be described.

Figure 2:
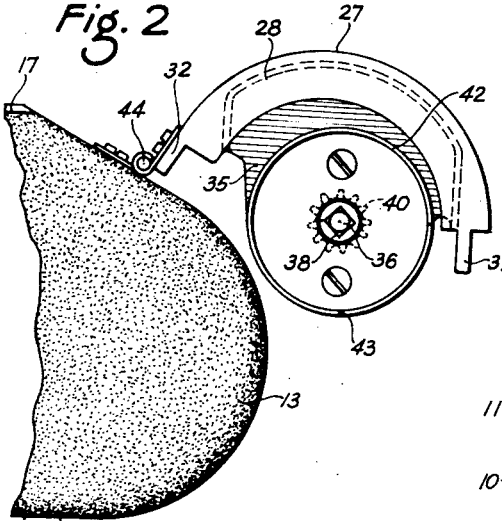
Fig. 2 is a partial plan view with the section of the casing forming the spool chamber in its loading or unloading position.
Figure 3:
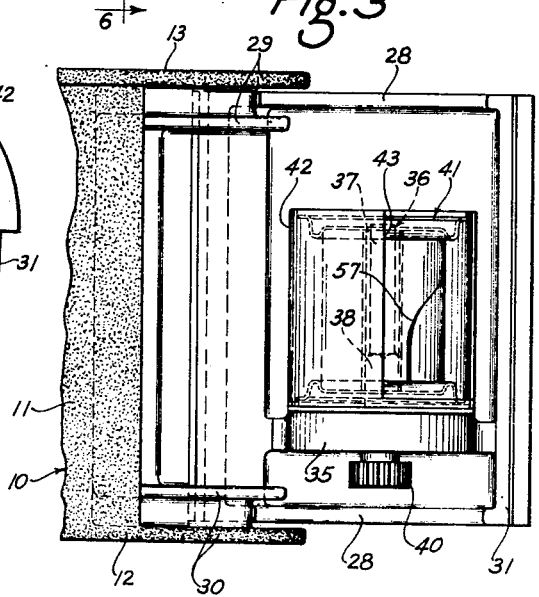
Fig. 3 is a partial rear elevation of the spool supporting section in its loading or unloading position.

The means for connecting the arcuate section 27 to the front of the casing 11 comprises the hinge member 44 which permits moving the section 27 away from the casing to a position, as shown in Figs. 2 and 3, for loading or unloading the film spool 41.

The spool 41 may be of the type disclosed in my U. S. Patent 2,367,514 which is provided with formed flanges 50 for retaining the film on the hub 51. The film F is moved from the spool 41 through the aperture 43 into the recess 25, across the aperture 26 and into the receptacle 22 where it is assisted into winding into a loose coil by the light leaf spring 52.

The driving means for propelling the film F from the spool 41 across the aperture 26, into receptacle 22, and then back onto the spool after each exposure has been made will now be described.

With the spool 41 located on the spindle 36 with the square section 38 engaging a corresponding aperture in the flange 50 to provide a driving connection and the section 27 in its enclosing position, the knob 53 is turned in a counter-clockwise direction to rotate the spindle 36 and the spool 41 in a clockwise direction through the gear 54 meshing with the pinion 40. As the spool is rotated, the finger 55 which is fixed to the guide 56 extends through the aperture 43 into the member 42 to pick up the leading edge 57 of the film, see Fig. 3. The finger 55 directs the film F between the extensions 58 on the guide 56 to bend the film transversely for removal from under the flanges 50. The guide 56 is positioned so as to then direct the film F into the opening 59 provided by the recess 25 in the plate 24 and the block 23 and past the exposure aperture 26 into the receptacle 22 where it is wound into a loose coil.

As the film F is moved through the opening 59, the leading edge of the film strikes the arm 60 of the lever 61 which is pivoted at 62 on the block 23 to rotate it in a counter-clockwise direction. This movement brings the arm 63 of the lever 61 opposite the notch 64 in the lever 65 and permits the lever 65 to rotate about its pivot 66 in a clockwise direction by means of the spring 67. The film F is of a standard perforated type and the movement of the lever 65 is limited by the pins 68 and 69 thereon, see Fig. 6, which are so spaced that both pins cannot enter the same film perforation. The mounting of pin 68 is disclosed in Fig. 6 in which the pin is shown fixed to the end of lever 65 and projecting through block 23, pin 69 being secured similarly to lever 65. In order to prevent the film from being drawn off the spool 41, two perforations are provided near the end of the film strip which are spaced to receive the pins 68 and 69 simultaneously, see Fig. 8.

The gear 54 also meshes with a pinion 70 which has integral therewith the ratchets 71 and 72 which are opposite in action. The lever 65 has a pawl arm 73 which is adapted to engage the ratchet 71 and a second pawl 74, which is also pivoted at 66, lies under the pawl arm 73 and is adapted to engage the ratchet 72 being held in engagement with the ratchet 72 by the spring 75. When the pin 68 is allowed to move against the film by the movement of the lever 61, the pawl 74 and pawl 73 are moved toward their respective ratchets. Since pin 68 is slightly longer than pin 69 and the pins are so arranged that both pins cannot enter the same film perforation, pin 69 determines the amount of movement of pin 68 into the perforations and, hence, the amount of movement of pawls 73 and 74. When winding film into receptacle 22, the direction of rotation of gear 70 and ratchets 71 and 72 is clockwise. As a result, when pin 68 enters a film perforation, the movement of lever 65 is limited by pin 69 but is sufficient to permit pawl 74 to engage ratchet 72 and insufficient for the pawl 73 to engage ratchet 71, and since the direction of rotation of ratchet 72 is clockwise, pawl 74 does not arrest the winding operation. Accordingly, pawl 73 engages ratchet 71 only when pins 68 and 69 simultaneously enter the two film perforations near the end of the film strip to permit lever 65 to be moved sufficiently by spring 67 so that pawl 73 moves into engagement with the ratchet 71 to arrest further rotation of knob 53 and winding of the film strip into receptacle 22. On the other hand, pawl 74 engages ratchet 72 each time pin 68 enters a film perforation but arrests the winding operation only when ratchet 72 is rotated in a counter-clockwise direction which occurs when the film strip is intermittently wound onto its spool, as described hereinafter. The camera is now ready for making exposures with all of the film with the exception of the length still connected to the hub 59, wound into the receptacle 22 in a loose coil.

The shaft 76 which carries the knob 53 and the gear 54 also has fixed thereto a ratchet 77. The rewind handle 78 is fixed to a collar 79 which in turn is secured to a bushing 80 carrying the plate 81. The plate 81 carries a pawl 82 and a cam 83, pivotally mounted at 95 on plate 81 and spring biased against a lug 96 on said plate, see Figs. 1 and 6. When intermittently winding the film strip on its spool, as described hereinafter, the gear 54 is rotated by pawl 82 engaging ratchet 77 fixed to gear 54 and, hence, with this arrangement there is no movement transmitted to the film strip as the handle 78 and plate 81 carrying pawl 82 and cam 83 are returned to their initial positions.

To intermittently rewind the film F onto the spool 41 after exposure, the handle 78 is rotated in a clockwise direction, see Fig. 1. During the first portion of this movement, the cam 83, which bears against the pin 84 on the pawl 73, rotates the lever 65 to remove the pawl 73 from engagement with the ratchet 71, the pins 68 and 69 from the film perforations and the pawl 74 from the ratchet 72 by means of the lug 85 formed down from the lever 65, see Fig. 9. During this movement, the pawl 82 is held out of engagement with the ratchet 77 by the pin 86 in engagement with the formed down arm 87 on the pawl 82. As the arm 87 moves along the pin 86, the pawl 82 is gradually brought into engagement with the ratchet 77 to rotate the gear 54 connected thereto and also the pinion 40 to rewind the film on the spool 41. When the cam 83 has left the pin 84 the pin 68 returns to the film, the pawl 73 being held out of engagement with the ratchet 71, as described above, the pawl 74 being held away from the ratchet 72 until the pin 68 enters the next film perforation at which time the pawl 74 arrests the movement of the handle 78 by engaging the ratchet 72, as shown in Fig. 10. This procedure is repeated until the last exposure is made when the pin 68 is held out by the film for lack of perforations until the edge 57 of the film leaves the arm 69 to permit the arm 63 to drop below the notch 64 to prevent the pin 68 from moving inward. This permits winding the leader strip onto the spool 41.

Figure 4:
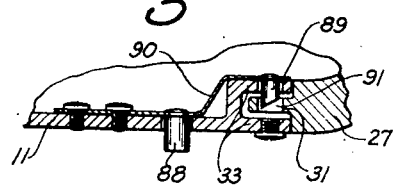
Fig. 4 is a partial section showing the arrangement for locking the spool supporting section in its chamber enclosing position.

The locking means for the section 27 in its enclosing position comprises a button 88, see Fig. 4, which is pushed inwardly to remove the bevelled pin 89 secured to the leaf spring 90 fixed to the wall 11 from the aperture 91 in the vertical flange 31 of the arcuate section 27 to permit swinging the section about its hinge 44 for removing the spool of exposed film. When the arcuate section 27 is moved, the pinion 40 is disengaged from the gear 54 and the drive means for advancing the film. The hinge 44 provides only one of several ways in which the section 27 can be connected to the casing 11 and moved to a loading or unloading position for the film spool and disconnecting the film spool from the drive means for the film.

Since other modifications of the construction shown are possible, the scope of the invention is not to be limited to the illustrated embodiment but is defined by the appended claims.

I claim:

1. In a photographic camera, the combination with a casing having a film take-up chamber and a film spool chamber at opposite ends thereof, and an exposure aperture for the film therebetween, of a moveable section forming a portion of said casing and said spool chamber and including a film spool spindle rotatably mounted thereon, said section being moveable to an open position to remove said spindle from said spool chamber so that a film spool may be placed on and removed from said spindle, means connecting said casing and said section to permit said section to be moved from said chamber enclosing position to said open position, and means operatively connected to said spindle for moving film from said spool past said exposure aperture only when said section is in the chamber enclosing position.

2. In a photographic camera, the combination with a casing having a film take-up chamber and a film spool chamber at opposite ends thereof, and an exposure aperture for the film therebetween, of a moveable section forming a portion of said casing and said spool chamber and including a support member and a film spool spindle rotatably mounted thereon, said section being moveable to an open position to remove said spindle from said spool chamber so that a film spool may be placed on and removed from said spindle, a hinge means connecting said casing and said section to permit movement of said section from said chamber enclosing position to said open position, and means operatively connected to said spindle for moving film from said spool past said exposure aperture only when said section is in the chamber enclosing position.

3. In a photographic camera, the combination with a casing having a film take-up chamber and film spool chamber at opposite ends thereof, and an exposure aperture for the film therebetween, of a moveable arcuate section forming a portion of the wall of said casing and said spool chamber and including a support member integral with said section and extending therefrom into said spool chamber and a spindle rotatably mounted on said support member, said section being moveable to an open position to remove said spindle from said spool chamber so that a film spool may be placed on and removed from said spindle, means connecting said casing and said arcuate section to permit movement of said section from said chamber enclosing position to said open position, and means operatively connected to said spindle for moving film from said spool past said exposure aperture only when said arcuate section is in the chamber enclosing position.

4. In a photographic camera, the combination with a casing having a film take-up chamber into which film may be wound in a loose coil and a film spool chamber, and an exposure aperture between said chambers, of a moveable arcuate section forming a portion of the wall of said casing and said spool chamber and including a support member integral therewith and extending flanges at the extremities of said section for forming a light-lock with said casing, and a spindle rotatably mounted on said support member, said section being moveable to an open position to remove said spindle from said spool chamber so that a film spool may be placed on and removed from said spindle, a cylindrical member concentrically mounted on said support member with respect to said spindle for enclosing a film spool on said spindle, hinge means connecting said casing and said arcuate section to permit movement of said section from a chamber enclosing position to said open position, and means operatively connected to said spindle for moving film from said spool past said exposure aperture only when said arcuate section is in the chamber enclosing position.

5. In a photographic camera, the combination with a casing having a film take-up chamber into which film may be wound in a loose coil and a film spool chamber, and an exposure aperture between said chambers, of a moveable arcuate section forming a portion of the wall of said casing and said spool chamber and having a support member for a film spool integral therewith, said section being moveable to an open position to remove said support member from said film spool chamber, a film spool centering means on said support member, a guide member secured to said support member for axially guiding a film spool to said centering means, means connecting said casing and said section to permit movement of said section from said chamber enclosing position to said open position to permit a film spool to be inserted into and removed from said guide member, and means operatively connected to said centering means for moving film from a film spool on said centering means past said exposure aperture only when said arcuate section is in the chamber enclosing position.

6. In a photographic camera, the combination with a casing having a film take-up chamber into which film may be wound in a loose coil and a film spool chamber, and an exposure aperture between said chambers, of a moveable arcuate section forming a portion of the wall of said casing and said spool chamber and having a support member for a film spool integral therewith, said section being moveable to an open position to remove said support member from said film spool chamber, a film spool centering means on said support member including a driving connection adapted to be engaged by a film spool, a cylindrical guide member concentrically mounted on said support member with respect to said centering means for axially guiding a film spool to said centering means, a hinge means connecting said casing and said arcuate section to permit movement of said section from said chamber enclosing position to said open position to permit a film spool to be inserted into and removed from said guide member, and means operatively connected to said centering means for moving film from said spool past said exposure aperture only when said arcuate section is in the chamber enclosing position.

7. In a photographic camera, the combination with a casing having a film take-up chamber and a film spool chamber at opposite ends thereof, an exposure aperture for film therebetween, a drive means for moving film from a spool in said spool chamber past said exposure aperture into said take-up chamber, and means operatively connected to said drive means for moving the film from said take-up chamber into said aperture for exposure and for rewinding the film onto the spool in said spool chamber, of a section adapted to form a portion of the wall of said casing and said spool chamber, a spindle carried by said section for receiving a film spool and operatively connected to said drive means, and means connecting said casing and said section to permit said section to be moved from a chamber enclosing position to a position for placing a film spool on said spindle and in which latter position said spindle is disconnected from said drive means.

8. In a photographic camera, the combination with a casing having a film take-up chamber into which film may be wound in a loose coil and a film spool chamber, an exposure aperture between said chambers, a drive means for moving film from a spool in said spool chamber past said exposure aperture into said take-up chamber, and means operatively connected to said drive means for intermittently moving portions of the film from said take-up chamber into said aperture for exposure and for rewinding the film onto the spool in said spool chamber, of an arcuate section adapted to form a portion of the wall of said casing and said spool chamber and having a support member for a film spool integral therewith and extending therefrom into said spool chamber, a spindle mounted in said support member for receiving a film spool and operatively connected to said drive means, and a hinge means connecting said casing and said arcuate section to permit movement of said section from a chamber enclosing position to a position for placing a film spool on said spindle and in which latter position said spindle is disconnected from said drive means.

9. In a photographic camera, the combination with a casing having a film take-up chamber into which film may be wound in a loose coil, a film spool chamber, an exposure aperture between said chambers, and a drive means for intermittently moving portions of the film from said take-up chamber into said aperture for exposure and for rewinding the film onto the spool in said spool chamber, of an arcuate section adapted to form a portion of the wall of said casing and said spool chamber and having a support member for a film spool integral therewith and extending therefrom into said spool chamber, inwardly extending flanges at the extremities of said section for forming a light-lock with said casing, a spindle mounted on said support member for receiving a film spool and operatively connected to said drive means, a cylindrical member concentrically mounted on said support member with respect to said spindle for enclosing a film spool, and a hinge means connecting said casing and said arcuate section to permit movement of said section from a chamber enclosing position to a position for inserting a film spool into said cylindrical member and onto said spindle and in which latter position said spindle is disconnected from said drive means.

10. In a photographic camera, the combination with a casing having a film take-up chamber and a film spool chamber at opposite ends thereof, an exposure aperture for film therebetween, a drive means for moving film from a spool in said spool chamber past said exposure aperture into said take-up chamber, and means operatively connected to said drive means for moving the film from said take-up chamber into said aperture for exposure and for rewinding the film onto the spool in said spool chamber, of a section adapted to form a portion of the wall of said casing and said spool chamber, a spindle carried by said section for receiving a film spool and operatively connected to said drive means, means connecting said casing and said section to permit said section to be moved from a chamber enclosing position to a position for placing a film spool on said spindle and in which latter position said spindle is disconnected from said drive means, and means on said casing for locking said section in its chamber enclosing position.

11. In a photographic camera, the combination with a casing having a film take-up chamber and a film spool chamber at opposite ends thereof, an exposure aperture for film therebetween, a drive means for moving film from a spool in said spool chamber past said exposure aperture into said take-up chamber, and means operatively connected to said drive means for moving the film from said take-up chamber into said aperture for exposure and for rewinding the film onto the spool in said spool chamber, of a section adapted to form a portion of the wall of said casing and said spool chamber, a film spool centering means carried by said section and operatively connected to said drive means, a guide member secured to said section for axially guiding a film spool to said centering means, and means connecting said casing and said section to permit movement of said section from a chamber enclosing position to a position for inserting a film spool into said guide member and in which latter position said centering means is disconnected from said drive means.

12. In a photographic camera, the combination with a casing having a film take-up chamber into which film may be wound in a loose coil and a film spool chamber, an exposure aperture between said chambers, a drive means for moving film from a spool in said spool chamber past said exposure aperture into said take-up chamber, and means operatively connected to said drive means for intermittently moving portions of the film from said take-up chamber into said aperture for exposure and for rewinding the film onto the spool in said spool chamber, of an arcuate section adapted to form a portion of the wall of said casing and said spool chamber and having a support member for a film spool integral therewith and extending therefrom into said spool chamber, a film spool centering means on said support member operatively connected to said drive means and including a driving connection adapted to be engaged by a film spool, a cylindrical guide member concentrically mounted on said support member with respect to said centering means for axially guiding a film spool to said centering means, and means connecting said casing and said section to permit movement of said casing and said section to permit movement of said section from a chamber enclosing position to a position for inserting a film spool into said guide member and in which latter position said centering means is disconnected from said drive means.

13. In a photographic camera, the combination with a casing having a film take-up chamber into which film may be wound in a loose coil and a film spool chamber, an exposure aperture between said chambers, a drive means for moving film from a spool in said spool chamber past said exposure aperture into said take-up chamber, and means operatively connected to said drive means for intermittently moving portions of the film from said take-up chamber into said aperture for exposure and for rewinding the film onto the spool in said spool chamber, of an arcuate section adapted to form a portion of the wall of said casing and said spool chamber and having a support member for a film spool integral therewith and extending therefrom into said spool chamber, a film spool centering means on said support member operatively connected to said drive means and including a driving connection adapted to be engaged by a film spool, a cylindrical guide member concentrically mounted on said support member with respect to said centering means for axially guiding a film spool to said centering means, means connecting said casing and said section to permit movement of said section from a chamber enclosing position to a position for inserting a film spool into said guide member and in which latter position said centering means is disconnected from said drive means, and means on said casing for locking said arcuate section in its chamber enclosing position.

JOSEPH MIHALYI.

REFERENCES CITED

The following references are of record in the file of this patent:

UNITED STATES PATENTS

| Number | Name | Date |
| --- | --- | --- |
| 920,901 | Bander | May 11, 1909 |
| 1,154,046 | Nasief | Sept. 21, 1915 |
| 1,532,544 | Newman | Apr. 7, 1925 |
| 2,249,929 | Baumgartner | July 22, 1941 |
| 2,336,278 | Mihalyi | Dec. 7, 1943 |
| 2,360,255 | Mihalyi | Oct. 10, 1944 |
| 2,364,381 | Mihalyi | Dec. 5, 1944 |
| 2,372,637 | Williamson et al. | Mar. 27, 1945 |